United States Patent
Jang et al.

(10) Patent No.: US 6,175,554 B1
(45) Date of Patent: Jan. 16, 2001

(54) ASYNCHRONOUS TRANSFER MODE (ATM) TRAFFIC CONTROL APPARATUS AND CONTROL METHOD FOR HANDLING A WIDE VARIETY OF ATM SERVICES

(75) Inventors: Wook-Jin Jang, Kyonggi-do; Chang-Soo Lim, Seoul, both of (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/066,927

(22) Filed: Apr. 28, 1998

(30) Foreign Application Priority Data

Oct. 23, 1997 (KR) .................................................. 97-54421

(51) Int. Cl.[7] .......................... G01R 31/08; G06F 11/00; F04B 17/04; H04M 15/00
(52) U.S. Cl. .......................... 370/229; 370/417; 379/111
(58) Field of Search .................................... 370/229–237, 370/252, 253, 255, 396, 412–418, 428, 445, 448, 465; 379/111

(56) References Cited

U.S. PATENT DOCUMENTS

| | | |
|---|---|---|
| 4,981,264 | 1/1991 | Katsube . |
| 5,166,894 * | 11/1992 | Saito ................................ 364/715.01 |
| 5,179,556 | 1/1993 | Turner . |
| 5,197,127 | 3/1993 | Waclawsky et al. ................. 395/200 |
| 5,276,677 | 1/1994 | Ramamurthy et al. . |
| 5,280,483 | 1/1994 | Kamoi et al. . |
| 5,313,454 | 5/1994 | Bustini et al. . |
| 5,448,559 * | 9/1995 | Hayter et al. ........................ 370/60.1 |
| 5,530,695 | 6/1996 | Dighe et al. . |
| 5,537,446 | 7/1996 | Lakshman et al. .................... 375/372 |
| 5,581,544 | 12/1996 | Hamada et al. ....................... 370/253 |
| 5,583,792 | 12/1996 | Li et al. ................................. 364/514 |
| 5,629,927 | 5/1997 | Waclawsky et al. ................. 370/253 |
| 5,634,006 | 5/1997 | Baugher et al. ................. 395/200.06 |
| 5,654,962 | 8/1997 | Rostoker et al. ..................... 370/232 |
| 5,675,576 | 10/1997 | Kalampoukas et al. ............. 370/232 |
| 5,677,907 | 10/1997 | Hamada et al. ...................... 370/253 |
| 5,689,500 | 11/1997 | Chiussi et al. ....................... 370/235 |
| 5,696,764 | 12/1997 | Soumiya et al. ..................... 370/395 |
| 5,768,257 * | 6/1998 | Khacherian et al. ................. 370/229 |
| 5,872,771 * | 2/1999 | Park et al. ............................ 370/252 |
| 5,963,542 * | 10/1999 | Shum ................................... 370/232 |

* cited by examiner

*Primary Examiner*—Hassan Kizou
*Assistant Examiner*—Duc Ho
(74) *Attorney, Agent, or Firm*—Robert E. Bushnell, Esq.

(57) ABSTRACT

An ATM traffic control apparatus and method for adaptively controlling ATM traffics. The ATM traffic control apparatus includes an output buffer for storing traffics generated by a plurality of traffic sources; traffic predictors of neural networks for generating predicted traffic values designating the number of cells which is expected to arrive during a future time slot, by adaptively learning the number of cells received during a setting time slot; a decision gate for deciding whether call congestion will happen by using predicted traffic values, an available buffer size of the output buffer and the number of cells to be transmitted during a setting time slot, and for generating the number of cells which can not be processed during a future time slot when it is decided that the congestion will happen; and a traffic controller of an expert system for calculating an optimal flow rate of each traffic source to control the congestion of the output buffer, by using service rates of the traffic sources, traffic types, peak bit rates, predicted traffic values, and the number of cells which can not be processed in the output buffer.

20 Claims, 8 Drawing Sheets

ASYNCHRONOUS TRANSFER MODE (ATM) TRAFFIC CONTROL APPARATUS AND CONTROL METHOD FOR HANDLING A WIDE VARIETY OF ATM SERVICES

CLAIM FOR PRIORITY

This application makes reference to, incorporates the same herein, and claims all benefits accruing under 35 U.S.C. §119 from an application for ASYNCHRONOUS TRANSFER MODE (ATM) TRAFFIC CONTROL APPARATUS AND METHOD earlier filed in the Korean Industrial Property Office on Oct. 23, 1997, and there duly assigned Serial No. 54421/1997, a copy of which application is annexed hereto.

BACKGROUND OF THE INVENTION

1. Technical Field

The present invention relates to a traffic control apparatus for an asynchronous transfer mode (ATM), and more particularly, relates to an ATM traffic control apparatus and method for adaptively controlling various kinds of ATM traffics to maintain quality of service (QoS) and avoid cell congestion.

2. Related Art

Asynchronous Transfer Mode (ATM) is a network protocol designed to efficiently provide service for a wide variety of applications such as high speed digital voice, video and data signals. Each of these applications has different service requirements in terms of cell loss and cell delay. For example, voice traffic can withstand a small amount of cell loss, but it is intolerant to cell delay. Video traffic can typically tolerate a small amount of cell loss, however, it is sensitive to cell delay. Data traffic, such as file transfers, can withstand a considerable amount of cell delay, but it is intolerant to cell loss. To accommodate these differences, each traffic is typically placed in a preassigned queue, each with a different service priority. During periods of network traffic congestion (due to excess arriving traffic), when network traffic demand exceeds the network's bandwidth capacity, servicing algorithms are typically employed to discriminate between different types of traffics in order to allocate bandwidth. Delay is managed by properly sizing the queue depths and prioritizing transmission within a specific type of traffic based upon a measure of the time that an ATM cell has been in the network.

Even with sophisticated queuing and service algorithms, traffic congestion can still occur. There have been several congestion control proposals for ATM networks. These congestion control proposals include traffic control mechanisms for controlling ATM traffic to avoid congestion, as disclosed, for example, in U.S. Pat. No. 4,984,264 for Call Admission Control Method And Cell Flow Monitoring Method In The Same Method issued to Katsube, U.S. Pat. No. 5,179,556 for Bandwidth Management And Congestion Control Scheme For Multicast ATM Networks issued to Turner, U.S. Pat. No. 5,197,127 for Expert System Method For Performing Window Protocol-Based Data Flow Analysis Within A Data Communication Network issued to Waclawsky et al., U.S. Pat. No. 5,276,677 for Predictive Congestion Control Of High-Speed Wide Area Networks issued to Ramamurthy et al., U.S. Pat. No. 5,280,483 for Traffic Control System For Asynchronous Transfer Mode Exchange issued to Kamoi et al., U.S. Pat. No. 5,313,454 for Congestion Control For Cell Networks issued to Bustini et al., U.S. Pat. No. 5,530,695 for UPC-Based Traffic Control Framework For ATM Networks issued to Dighe et al., U.S. Pat. No. 5,581,544 for Method And Apparatus For Evaluating QOS In ATM Multiplexing Apparatus In Which Priority Control Is Performed And For Controlling Call Admissions And Optimizing Priority Control On The Basis Of The Evaluation issued to Hamada, U.S. Pat. No. 5,583,792 for Method And Apparatus For Integration Of Traffic Measurement And Qeueing Performance Evaluation In A Network System issued to Li et al., U.S. Pat. No. 5,654,962 for Error Detection And Correction Method For An Asynchronous Transfer Mode (ATM) Network Device issued to Rostoker et al., U.S. Pat. No. 5,675,576 for Concession Control System And Method For Packeting Switched Networks Providing Max-Min Fairness issued to Kalampoukas et al., U.S. Pat. No. 5,689,500 for Multistage Network Having Multicast Routing Congestion Feedback issued to Chiussie et al., and more recently, U.S. Pat. No. 5,696,764 for ATM Exchange For Monitoring Congestion And Allocating And Transmitting Bandwidth-Guaranteed And Non-Bandwidth Guaranteed Connection Calls issued to Soumiya et al. Many of these traffic control proposals are susceptible to time delay, difficulty in satisfying quality of service (QoS) demanded by users, and to abrupt environmental change in the ATM network.

Other proposal of congestion control in ATM networks is a congestion prevention technique as described in "Survey of Traffic Control Schemes and Protocols in ATM Networks" by J. J., BAE and T. Suda, in Proc. IEEE, vol. 79, pp. 170–189, February 1991. Such a congestion prevention technique is designed to prevent congestion before the congestion is inevitable. The intended purpose is to ensure that the network traffic does not reach a level which causes unacceptable congestion. However, the analysis of offered traffic and network state is not suitable for handling a wide variety of ATM traffics, the high quality of service (QoS) demanded by users and the diversity by the combinations. Moreover, such a congestion prevention technique is also not flexible to unexpected changes in traffic characteristics.

As a result, we have observed that an ATM network must be equipped with a highly sophisticated and flexible congestion control function to effectively avoid congestion and to efficiently maintain high quality of service (QoS) for each traffic source in accordance with unexpected changes in traffic conditions. Moreover, the ATM network must include an intelligent control mechanism to handle a wide variety of ATM services and the diversity by their combinations.

SUMMARY OF THE INVENTION

Accordingly, it is therefore an object of the present invention to provide a traffic control apparatus for an asynchronous transfer mode (ATM) network to avoid cell congestion.

It is also an object to provide a traffic control apparatus for an asynchronous transfer mode (ATM) network to maintain high quality of service for each traffic source.

It is further an object to provide a traffic control apparatus for an asynchronous transfer mode (ATM) network to avoid congestion and maintain high quality of service (QoS) for each traffic source in accordance with unexpected changes in traffic conditions.

It is another object to provide a traffic control apparatus for an asynchronous transfer mode (ATM) network and method for predicting whether congestion will happen by future traffic values in order to avoid cell congestion, to maintain high quality of service demanded by users and control a traffic at an optimal flow rate.

These and other objects of the present invention can be achieved by an ATM traffic control apparatus including an output buffer for storing traffics generated from a plurality of different traffic sources; a plurality of traffic predictors of neural networks corresponding to the different traffic sources for generating predicted traffic values designating the number of cells which is expected to arrive during a future time slot, by adaptively learning the number of cells received during a setting time slot; a decision gate for determining whether cell congestion will occur by using the predicted traffic values, an available buffer size of said output buffer and the number of cells to be transmitted during a setting time slot, and for generating the number of cells which can not be processed during a future time slot when it is decided that the congestion will occur; and a traffic flow rate controller (TFRC) of an expert system for calculating an optimal flow rate of each traffic source to control the congestion of the output buffer, by using service rates of the traffic sources, traffic types, peak bit rates, predicted traffic values, and the number of cells which cannot be processed in the output buffer.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
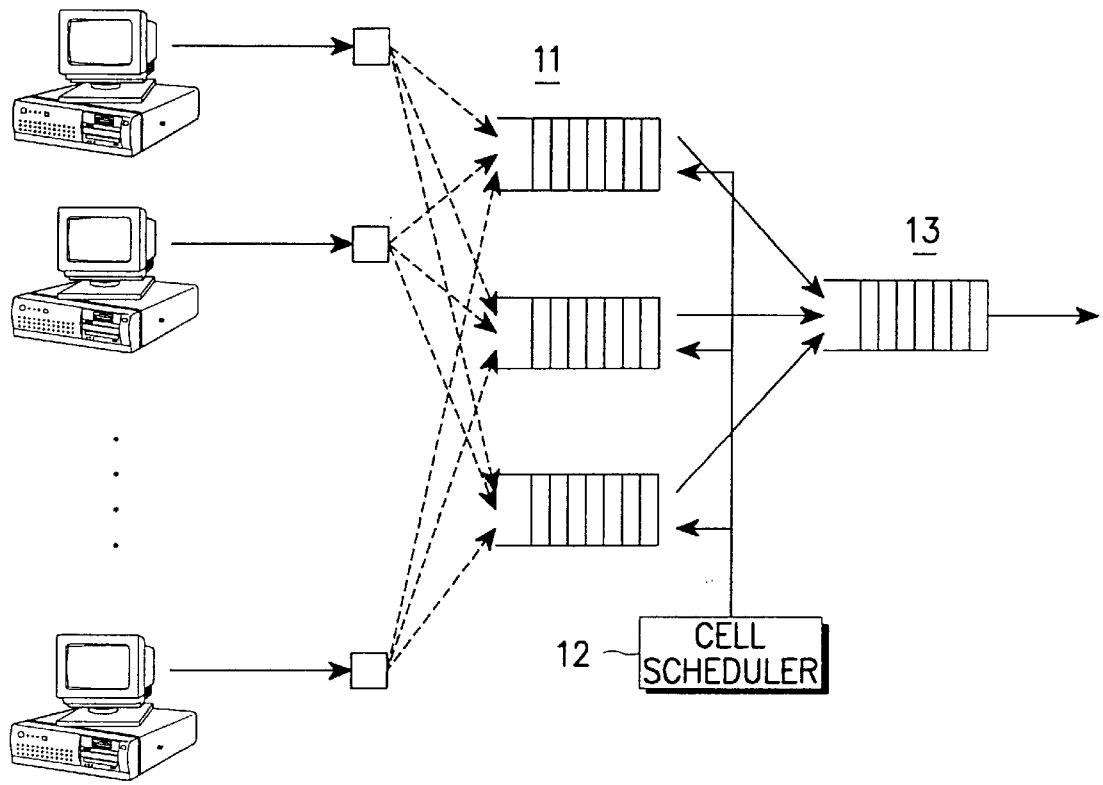
FIG. 1 illustrates an exemplary ATM traffic control apparatus.

Referring now to the drawings and particularly to FIG. 1, which illustrates an exemplary ATM traffic control apparatus having a plurality of priority queues 11 connected to respective input nodes, a cell scheduler 12 and an output buffer 13. Each traffic is classified into groups by a user according to quality of service (QoS), and the classified traffic is transmitted to priority queues 11. The cell scheduler 12 is used to transmit cells from each priority queue 11 to the output buffer 13 according to the status of each priority queue 11 and its priority.

As we have noted, however, such an ATM traffic control apparatus has a number of disadvantages. First, while the each traffic is classified and transmitted to the corresponding priority queue 11 and scheduled in the queue 11, time delay is increased. Second, since a large number of priority queues 11 cannot be used, it is difficult to satisfy the quality of service (QoS) demanded by the user, and the QoS should be controlled according to the class. Third, it is difficult to adaptively cope with an environmental state or an abrupt change of the ATM network.

An ATM network as described, is used to process a variety of traffics including voice, video and data signals. Each traffic has a unique bandwidth ranging from a few kilobits per second to 50 or 100 magabits per second, and requires different quality of service (QoS). In order to process several types of traffics and to maintain the QoS for each traffic source, the ATM traffic control apparatus must handle corresponding traffics flexibly and adaptively. There are QoS parameters for the ATM network, such as a cell transmission delay and a cell loss ratio, and the requirements for these parameters differ between users and service systems. During call set-up, a traffic contract is determined between the network and the user. The QoS parameter is declared in the agreed contract. The ATM network maintains the QoS as long as the user does not violate his contractual parameters.

In the ATM network, most traffic sources are bursty. A bursty source generates traffic cells, and as soon as it becomes inactive, no cells is generated. Since the ATM network handles a large number of bursty traffic sources, statistical multiplexing is used to improve the efficiency of the bandwidth by sharing the same bandwidth so as to allow more traffics. However, if a large number of traffic sources become active simultaneously, severe network congestion may happen. There are many approaches to control cell congestion in the ATM network. However, most contemporary congestion control techniques are not suitable for handling a wide variety of traffics, the QoS and the diversity by their combination. Moreover, many congestion control techniques are also not flexible to handle unexpected changes in traffic characteristics.

In order to prevent cell congestion and to maintain the QoS for each traffic source, as we have noted previously, the ATM network must be equipped with a highly sophisticated and flexible congestion control function to effectively avoid congestion and to efficiently maintain high quality of service (QoS) for each traffic source in accordance with unexpected changes in traffic conditions. Moreover, the ATM network must include an intelligent control mechanism to handle a wide variety of ATM services and the diversity by their combinations.

Figure 2:
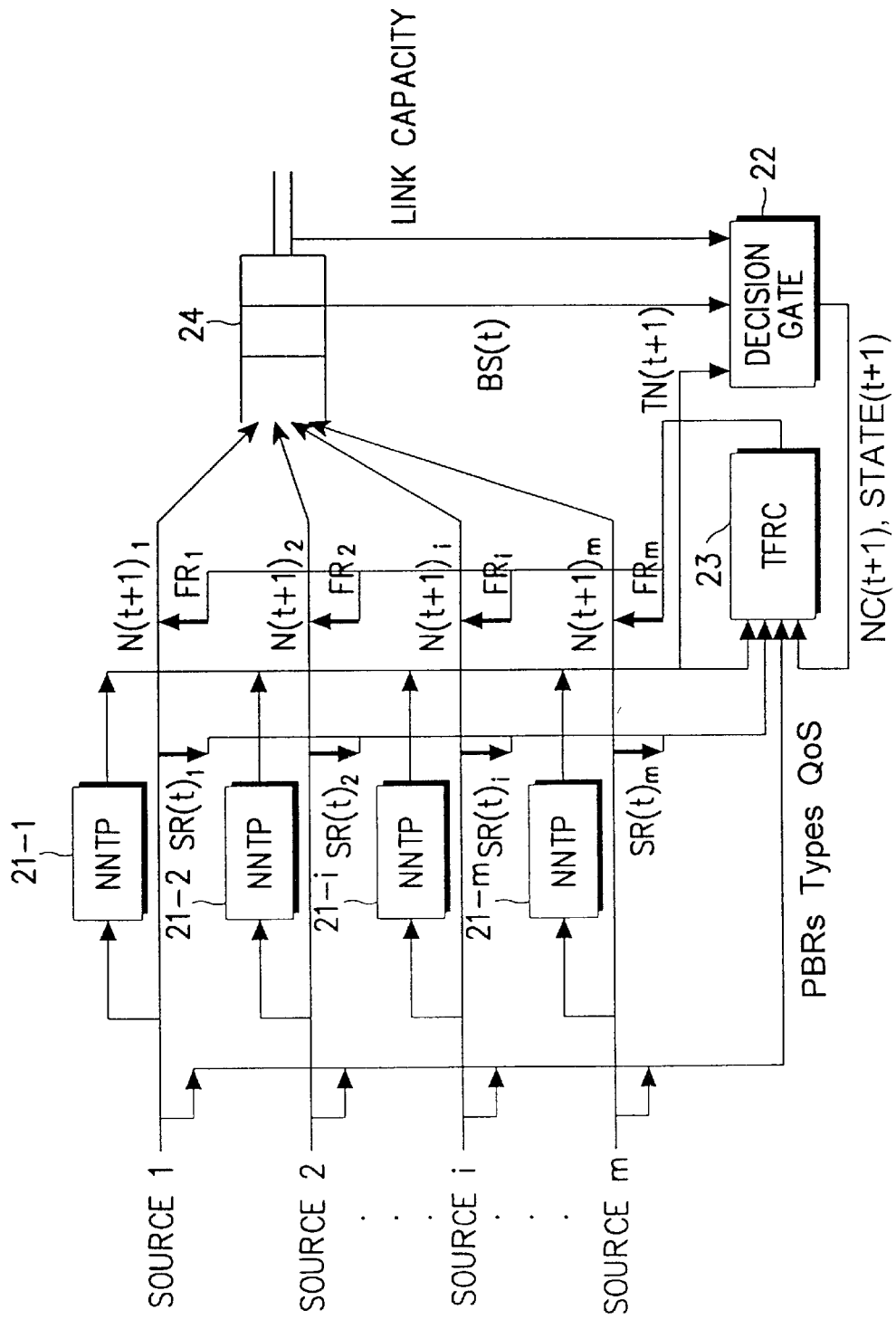
FIG. 2 illustrates an ATM traffic control apparatus constructed according to a preferred embodiment of the present invention.

Turning now to FIG. 2 which illustrates a traffic control apparatus for an asynchronous transfer mode (ATM) network to avoid congestion and maintain high quality of service (QoS) for different traffic source according to the principles of the present invention. The ATM network as contemplated is a high-speed multimedia network which is capable of handling a wide variety of traffics with different bit rates and different QoS. In a preferred embodiment of the present invention, the ATM traffic control apparatus is provided with an intelligent architecture using recurrent neural networks and an expert system to handle a wide variety of traffics. The traffic control apparatus using the neural networks can learn the characteristics of the offered traffic and dynamic changes of the traffic. The neural networks are based on the prediction of a future value of the offered traffic and a flow rate for each traffic source. At every given time slot, the ATM traffic control apparatus predicts whether the congestion will happen and regulates the volume of the input traffic for each traffic source before the congestion happens. Further, the ATM traffic control apparatus maintains the QoS demanded by the user for each traffic source on the basis of predefined rules. Consequently, the ATM traffic control apparatus guarantees the QoS for each traffic source and efficiently prevents congestion.

Referring to FIG. 2, the ATM traffic control apparatus includes neural network traffic predictors (NNTPs) 21-1 . . . 21-$m$, a decision gate 22 and a traffic flow rate controller (TFRC) 23. The ATM traffic control apparatus controls the traffic based on the adaptive prediction of the future value of the offered traffic and the flow rate of each traffic source. An output buffer 24 stores first to m-th traffic sources.

The number of the NNTPs 21-1 . . . 21-$m$ corresponds to the number of the first to m-th traffic sources. The NNTPs 21-1 . . . 21-$m$ predict the traffic for a future given time with respect to the first to m-th traffic sources and generate predicted traffic values $N(t+1)_1$ . . . $N(t+1)_m$. The NNTPs 21-1 . . . 21-$m$ are trained to predict the traffic for a given time by traffic values $N(t)$~$N(t-(n-1))$ of n past time slots of corresponding traffic sources, and cope with the characteristics and abrupt changes of each kind of traffic. An input traffic of each of the NNTPs 21-1 . . . 21-$m$ is defined as the number of cells during the n past time slots by the unit of the number of cells arriving during one time slot at a time t. An output traffic of each of the NNTPs 21-1 . . . 21-$m$ is the number of cells which is expected to arrive during one future time slot and predicted every unit time.

The decision gate 22 receives a value $TN(t+1)$ obtained by adding the predicted traffic values $N(t+1)_1$ . . . $N(t+1)_m$ generated from the NNTPs 21-1 . . . 21-$m$ to each other, the total number TC of cells to be transmitted during one time slot from the output buffer 24, and an effective size $BS(t)$ of the output buffer 24. The decision gate 22 judges whether cell congestion is predicted by analyzing the above three inputs, and generates an on/off-state signal of the next time slot and the number $NC(t+1)$ of cells which can not be processed by the output buffer 24. That is, the decision gate 22 judges whether the congestion will happen or not from the output buffer 24 and decides its on/off-state according to the judged result. Whether the congestion will happen or not is judged by predicting the number $NC(t+1)$ of cells which can not be processed by the output buffer 24 using the sum $TN(t+1)$ of the predicted traffic values $N(t+1)_1$ . . . $N(t+1)_m$, the total number TC of cells to be transmitted from the output buffer 24, and the effective size $BS(t)$ of the output buffer 24.

The TFRC 23, which is an expert system, receives the QoS, peak bit rates PBRs, traffic types, service rates $SR((t)_1, \ldots SR(t)_m$, the predicted traffic values $N(t+1)_1 \ldots N(t+1)_m$ generated from the NNTPs 21-1 . . . 21-$m$ and the number $NC(t+1)$ generated from the decision gate 22, and generates flow rates $FR_1$~$FR_m$ of the traffic sources. That is, the TFRC 23 controls the call congestion by calculating the optimal flow rate by use of the QoS, traffic parameters, traffic types, predicted traffic values, etc.

The operation of the ATM traffic control apparatus of FIG. 2 will now be described in detail with reference to FIG. 2 as follows. When a call admission controller (CRC) decides to accept a call for a call set-up request of the user, the NNTPs 21-1 . . . 21-M predict the traffic (the number of cells) coming from the traffic source during a given time slot. The decision gate 22 determines whether the congestion will happen or not. If there is any chance that the congestion will happen, the TFRC regulates the flow rate by using the predicted traffic value and the current status of the network before the actual traffic arrives.

The above-described ATM traffic control apparatus has 3 major advantages. First, the NNTP can handle the dynamic changes of the offered traffic by adaptively learning the characteristics of the unexpected changes of the traffic. Second, it is possible to predict the future value (the number of cells) of the offered traffic during a given time slot. Since the NNTP does not wait for the actual cell, there is no delay. That is, the NNTP saves a cell transmission delay time without input queuing. Therefore, such a structure is effective in handling traffics sensitive to a delay, such as voice and video. Third, the ATM traffic control apparatus maintains the QoS demanded by the user while other structures concern the QoS for a certain group of the traffic.

Figure 3:
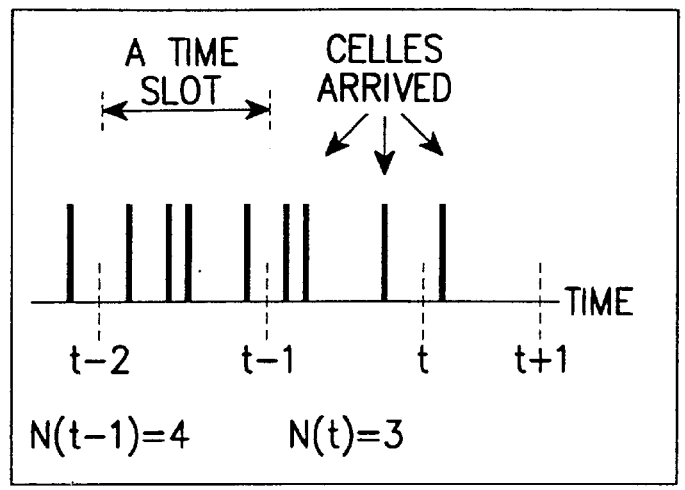
FIG. 3 illustrates traffic values defined by the number of cells arriving during a time slot.

Hereinafter, the operation of the NNTPs 21-1, . . . , 21-$m$ will be described. In order to prevent congestion before the congestion occurs, the traffics which are expected to arrive should be predicted. Since the neural network has a learning function, it is suitable for managing the different types of traffics. The NNTP is trained to learn the characteristics of various types of traffics (for example, voice, data, video) and handles future traffic values by using past traffic values of adaptive learning schemes. The traffic values are predicted by counting the number of traffic cells arriving during a given time slot. The NNTP can predict the future traffic values by using the past traffic values. Referring to FIG. 3, the input of the NNTP is the traffic value during n past time slots at a time t and can be expressed as:

$$\text{Input Vector}(t)=[N(t)N(t-1)N(t-2) \ldots N(t-(n-1))]^T \quad (1)$$

where $N(t)$ is the number of traffic cells arriving during a time slot at a time t, and T is a transpose. The output of the NNTP at a time t is the number of the predicted traffic cells during a future time slot at a time t+1. This can be represented as:

$$\text{Output Vector}(t)=[N(t+1)] \quad (2)$$

In a call set-up process, the user declares a connection class of the traffic. Therefore, the NNTP selects a corresponding input-output mapping function which contains specific information about the class of the traffic. When the call is accepted, the NNTP starts to predict the number of cells to be offered during a future time slot and continues to adaptively learn the characteristics of the traffic when the actual traffic is offered. The NNTP is composed of P modules, each representing a recurrent neural network shown in FIG. 4.

Figure 4:
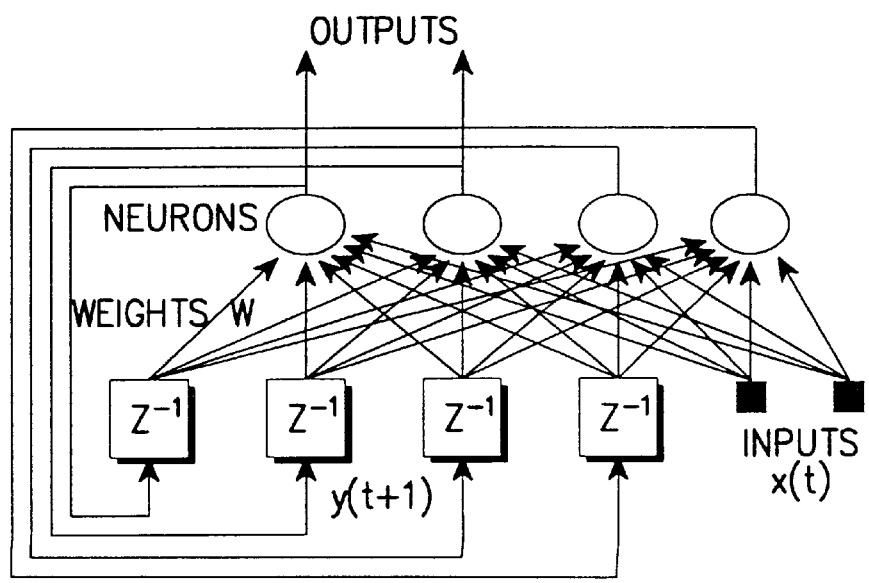
FIG. 4 illustrates a module constituting a neuron network traffic predictor (NNTP)
Figure 5:
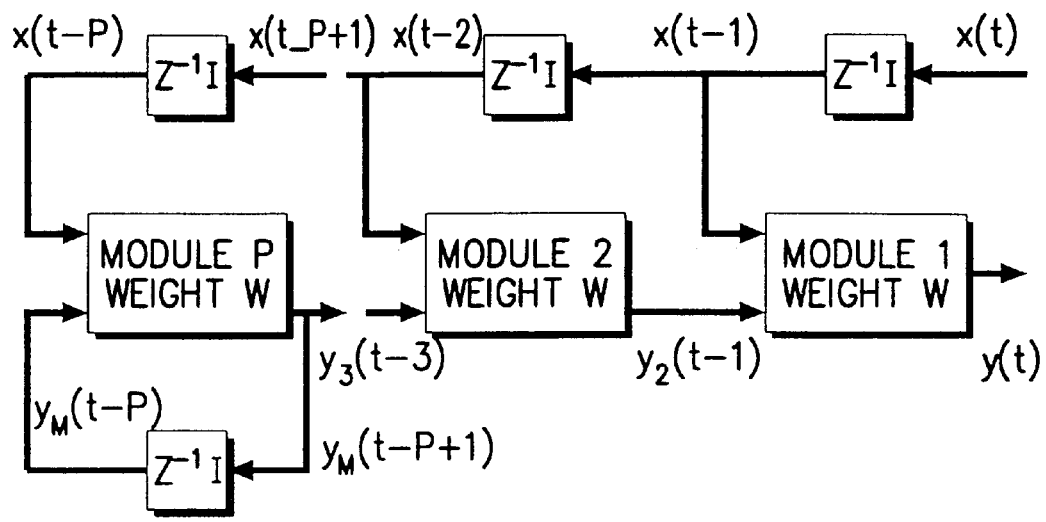
FIG. 5 illustrates a neural network traffic predictor (NNTP) with P modules.

Referring to FIG. 4, the module consists of N neurons each having M external input connections. It is assumed that $x(t)$ is an M-by-1 external input vector applied to the network at a discrete time, and $y(t+1)$ is an N-by-1 vector of an individual neural output produced at a time t+1. An error signal $e(t)$ denotes the difference between a desired response and a neuron output computing a change in a weight. Each module of the NNTP receives an input vector of past values of the offered traffic. This can be given as:

$$x(t-k)=[N(t-k), N(t-k-1), \ldots, N(t-k-p+1)]^T \quad (3)$$

where k=1, 2, 3 ... M. An output vector $y_k(t-k+1)$ of N neurons of a module k calculated at a time t−k+1 is as follows:

$$y_k(t-k+1)=[y_{k,1}(t-k+1), y_{k,N}(t-k+1), \ldots, y_{k,N}(t-k+1)]^T \quad (4)$$

An output vector $y_M(t-k+1)$ of the neurons of the last module (for example, a module P) is fed back to inputs of the neurons after a delay of one time unit. The output vector $y_M(t-P+1)$ is directly fed back to a module P-1. Each module computes an error signal defined as:

$$e_{k,1}(t-k+1)=N(t-k+1)-y^{k,1}(t-k+1) \quad (5)$$

where k=1, 2 ... P, N(n−k+1) is a sample of an input traffic signal, and $y_{k,1}(t-k+1)$ is a neuron output at a module k. The overall output is determined by the neuron output of a module 1, as indicated by:

$$y(t)=y_{1,1}(t) \quad (6)$$

Figure 6:
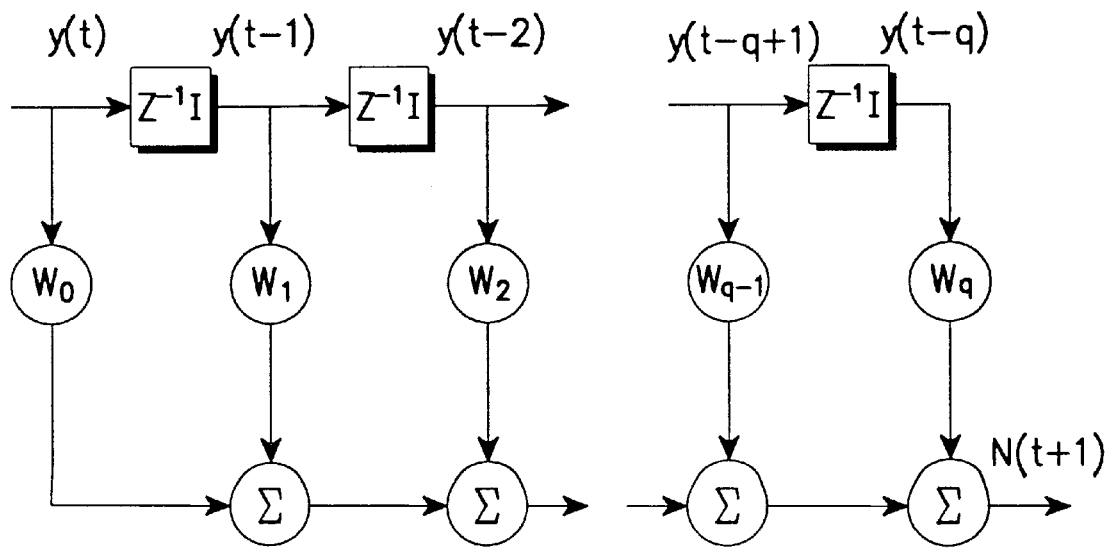
FIG. 6 illustrates a tapped-delay-line filter.

The output of the NNTP is calculated using q past values y(t−1), y(t−2), ..., y(t−q). The (q+1) tap weights of a filter constituting a weight vector w, are adjusted using the standard least-mean13 square algorithm to optimize the predicted value N(t+1). FIG. 6 illustrates a tapped-delay-line filter. Therefore, the NNTP can handle a variety of traffics and the dynamic changes of the unexpected traffic. At every time slot, each NNTP predicts the future traffic N(t+1) for the offered traffic source, and the traffic vector TN(t+1) predicted from all the traffic sources is sent to the decision gate 22 and the TFRC 23. The traffic vector TN(t+1) predicted from all the traffic sources is defined as:

$$TN(t+1)=[N_1(t+1)N_2(t+1) \ldots N_m(t+1)]^T \quad (7)$$

where m is the number of traffic sources.

The operation of the decision gate 22 will now be described. First, the decision gate 22 determines whether the congestion will happen by calculating the number NC(t+1) of cells which may cause the congestion in a future time slot and determines its state as an on-state or an off-state. The number NC(t+1) of cells which may cause the congestion in a future time slot is given as:

$$NC(t+1)=TN(t+1)-BS(t)-TC \quad (8)$$

where TN(t+1) is the traffic vector predicted from all the traffic sources, BS(t) is the currently available buffer space (cell), and TC is the number of cells transmitted to the network in a time slot. TC is defined as:

$$TC=\Delta t/(C/L) \quad (9)$$

where $\Delta t$ is a time slot, C is a cell size, and L is a link capacity. The decision gate 22 decides its state by using the number NC(t+1) of cells which may cause the congestion in a future slot time as follows:

$$\text{On-state if } NC(t+1)>0$$
$$\text{Off-state if } NC(t+1)\leq 0 \quad (10)$$

The operation of the TFRC 23 will now be described. The TFRC 23 is an expert system which is designed to calculate the optimal flow rate for each traffic according to predefined rules for preventing the congestion. The TFRC 23 regulates the traffic flow rate for each traffic source by using the traffic vector TN(t+1) predicted from the NNTP and the number NC(t+1) of cells which may cause the congestion calculated from the decision gate 22. The TFRC 23 maintains the QoS demanded by the user with respect to each traffic source. Therefore, the TFRC 23 prevents the congestion and maintains the QoS for each traffic source. The TFRC 23 performs the above functions on the basis of the following predefined rules. If the decision gate 22 is at an on-state, the TFRC 23, first, decreases the flow rate in the order of a service rate of each traffic source while maintaining the QoS demanded by the user. Second, the TFRC 23 does not regulate the flow rate of the traffic whose predicted value N(t+1) is 0. Third, the TFRC 23 sends the cell which is not sensitive to a delay to an extra buffer. Fourth, if the flow rate of the traffic is greater than a peak bit rate, the TFRC 23 drops the cell. If the decision gate 22 is at an off-state, the TFRC 23 sends the cells of the proper number to the output buffer from the extra buffer.

The input of the TFRC 23 for m sources at a time t is expressed as:

Input Vector=

$[N(t+1)_1QoS_1SR(t)_2PBR_2\text{Type}_1$ $N(t+1)_2QoS_2SR(t)_2PBR_2\text{Type}_2$

...

$N(t+1)_iQoS_iSR(t)_iPBR_i\text{Type}_i$

...

$N(t+1)_mQoS_mSR(t)_mPBR_m\text{Type}_m$ $NC(t+1)]^T \quad (11)$ where $SR(t)_i$ is a service rate for an i-th traffic source until a time t, $PBR_i$ is a peak bit rate of the traffic, and $\text{Type}_i$ is a type of the traffic. The output of the TFRC 23 is the vector of the flow rate for m sources, expressed as:

$$\text{Output Vector}(t)=[FR_1FR_2 \ldots FR_i \ldots FR_m]^T \quad (12)$$

where $FR_i$ is the flow rate for an i-th traffic source.

As described above, the traffic control apparatus of an intelligent structure has three controllers: the NNTP, TFRC and decision gate. The decision gate 22 predicts whether the congestion will happen or not by the future traffic value predicted from the NNTP. The TFRC 23 maintains the QoS demanded by the user and controls the traffic by the optical flow rate which can prevent the congestion.

In the operation of the ATM traffic control apparatus, it is assumed that voice data has the peak bit rate of 64 Kbps and 32 Kbps and the time slot of 24 ms. Assuming that a call generating period is 6 ms for the voice data of 64 Kbps, the maximum number of cells generated during the time slot of 24 ms is 4. If the number of cells arriving during a time slot is over 4, it is judged that the user violates the bit rate. Then the traffic control apparatus drops all the violated cells.

In a traffic data generating process, each call has on and off time. It is assumed that on-time period (Ton=360 ms) and an off-time period (Toff=640 ms) are exponentially distributed. During the on-time period, the fixed number of cells is generated for a duration T ms, whereas during the off-time period, no cells are generated. It is assumed that T=6 ms for the voice data of 64 kbps and T=12 ms for the voice data of 32 kbps.

Figure 7A:
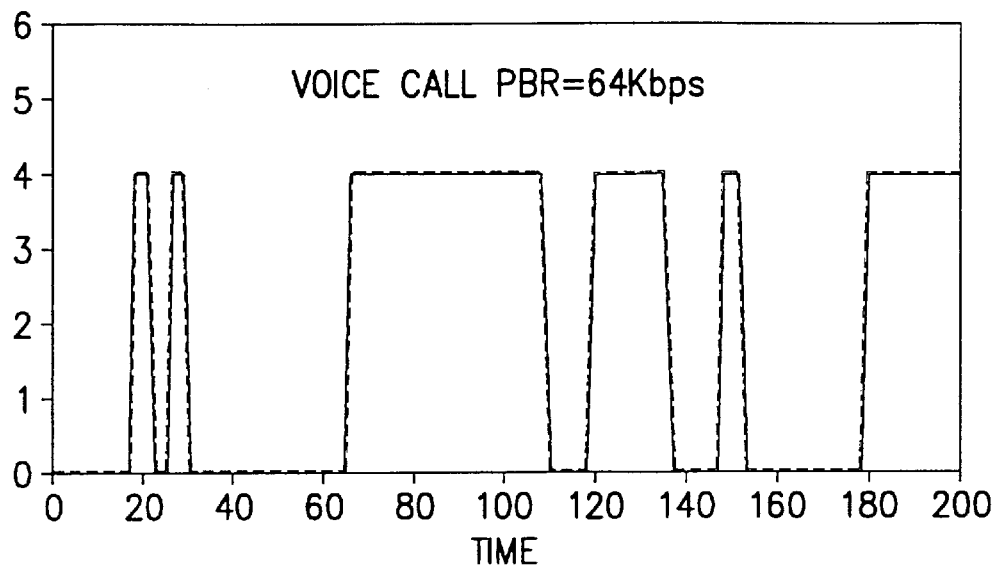
FIGS. 7A and 7B illustrate characteristics of an actual traffic and a predicted traffic in a neural network traffic predictor (NNTP)
Figure 7B:
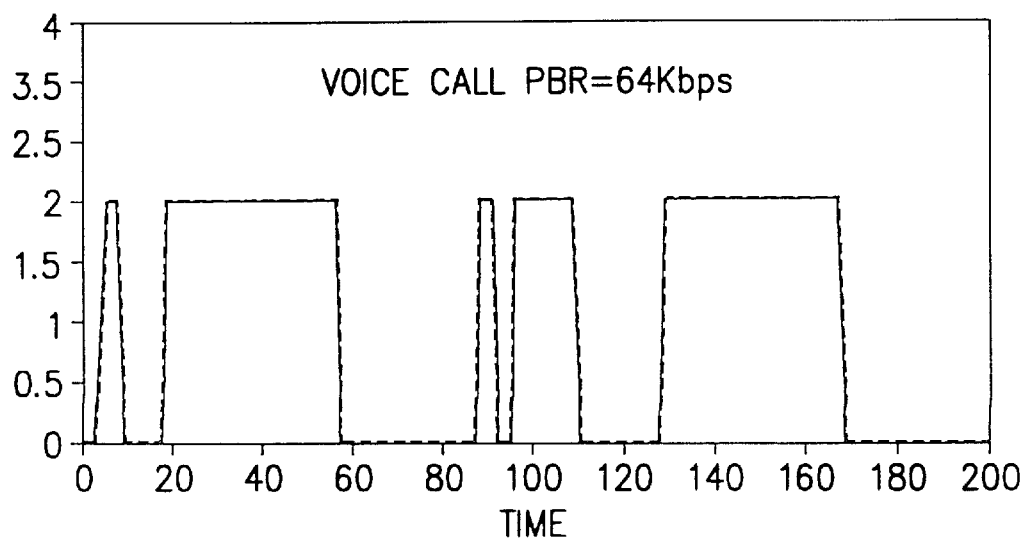

In the operation of the NNTP, if the past value of traffic data for 50 time slots is used, the NNTP predicts the traffic value during one future time slot. FIGS. 7A and 7B show the simulation result of the NNTP. As shown in FIGS. 7A and 7B, the performance of the NNTP is good, and the ratio of the correct prediction of the number of cells which is expected to arrive in a future time slot is over 93%. By using the predicted result of the traffic, the decision gate 22 can determine whether the congestion will happen or not under the current network status.

Figure 8A:
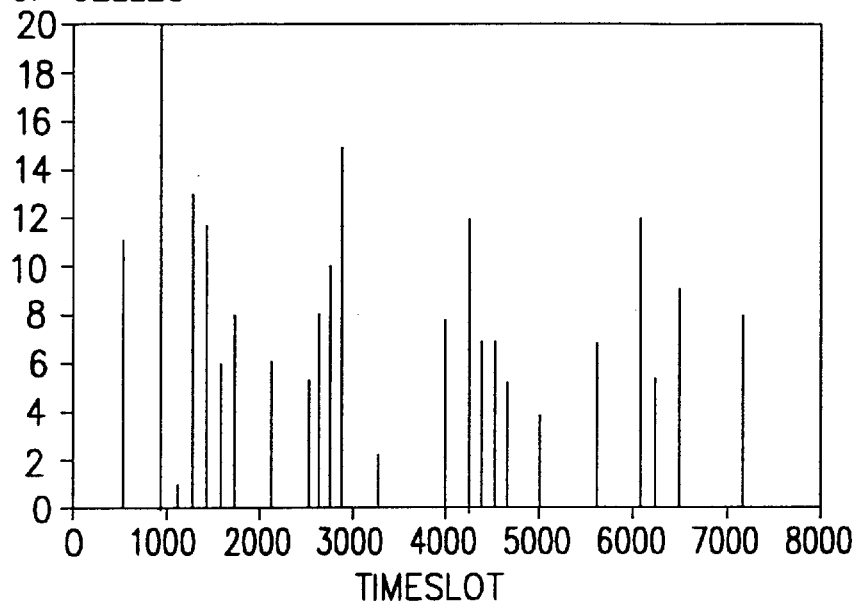
FIGS. 8A and 8B illustrate the actual number and the predicted number of cells which may cause congestion in a next time slot.
Figure 8B:
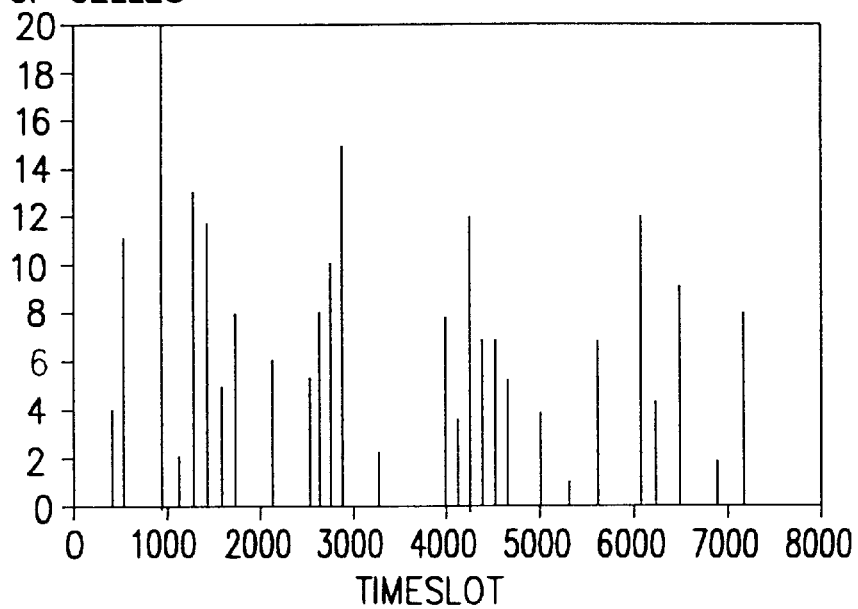

In the operation of the decision gate 22, the decision gate 22 receives the total predicted values of future traffics for all the sources from the NNTP and decides the on/off-state by using the current network status (available buffer space and link capacity). If the ATM network can handle the cells of the total number predicted from all the traffic sources, the decision gate 22 becomes an off-state. Otherwise, the decision gate 22 becomes an on-state and sends the number NC(t+1) of cells which may cause the congestion to the TFRC 23. FIG. 8A shows the actual number of cells which may cause the congestion. FIG. 8B shows the simulation result of the decision gate 22.

In the operation of the TFRC 23, it is assumed that only a cell loss ratio for the QoS demanded by the user is considered since the cell delay standard for the voice data is satisfied if the buffer size B=10000 DL/C (where D is a maximum admissible delay time of miliseconds, L is a link capacity, and C is a cell size of the unit of bits). For example, L=0.8 Mbps, B=11 cells, and QoS=$10^{-2}$.

Figure 9A:
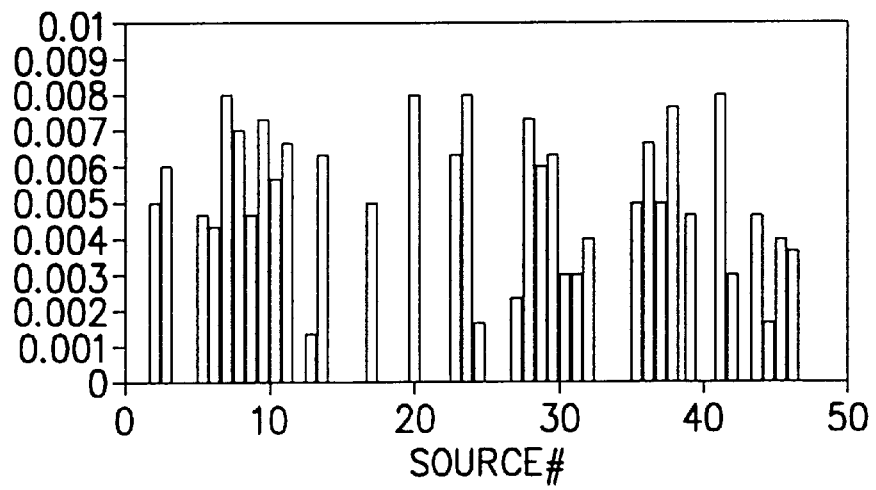
FIGS. 9A and 9B illustrate simulation results of a traffic flow rate controller (TFRC) for the maintained quality of service and the uncontrolled quality of service.
Figure 9B:
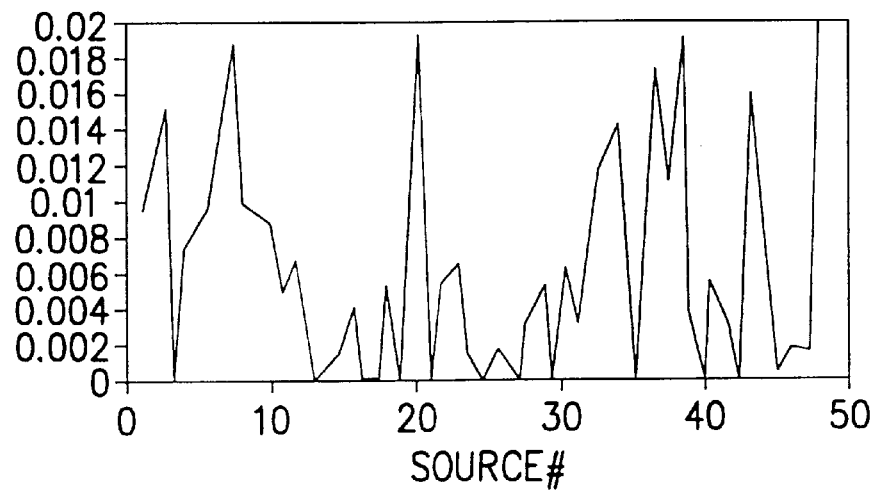
Figure 10:
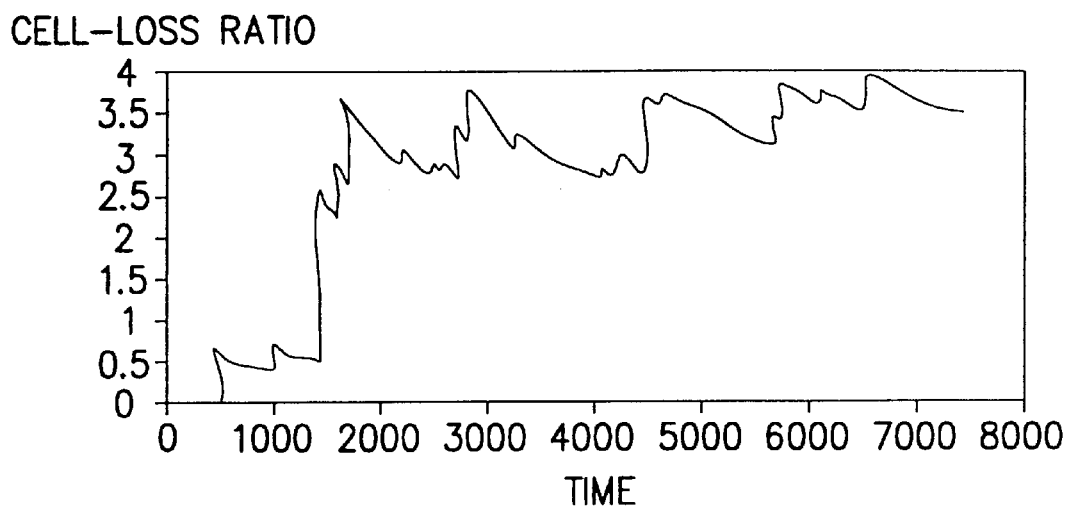
FIG. 10 illustrates a cell loss ratio of a buffer.

The TFRC 23 regulates the traffic flow. The TFRC 23 prevents the congestion and maintains the QoS for each traffic source. If the TFRC 23 receives the traffic characteristics such as the number N(t+1) of the predicted traffic cells and the service rate, and information about the congestion such as the number NC(t+1) of traffic cells which may cause the congestion and the on or off-state signal of the decision gate, it starts to control the traffic flow based on the predefined rules. When the TFRC 23 decreases the flow rate of a certain traffic, the traffic may lose some cells and the service rate for the traffic is changed by the accumulated cell loss ratio. When considering the service rate of each traffic at each time slot, the TRFC 23 efficiently controls the traffic flow and maintains the QoS for each traffic source. FIGS. 9A and 9B show the simulation results of the TRFC 23 for the maintained QoS and the uncontrolled QoS, respectively. Since the ATM traffic control apparatus in accordance with the present invention is based on the prediction of the future value of the offered traffic, the controllers can not prevent the congestion perfectly. Therefore, a few cells are dropped in the buffer shown in FIG. 2. However, the cell loss ratio is very small and has no effect on the quality of service (QoS) demanded by the user. FIG. 10 shows the simulation result of the TRFC 23 for controlling the congestion.

As described above, the ATM traffic control apparatus predicts the future traffic and traffic flow rate for each traffic source. Therefore, the QoS demanded by the user can be satisfied and a wide variety of traffics can be effectively processed. Furthermore, the congestion can be prevented even when there are abrupt changes of traffic in the network.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A traffic control apparatus for an asynchronous transfer mode (ATM) network, comprising:
    an output buffer for storing traffics generated by a plurality of traffic sources;
    traffic predictors for generating predicted traffic values designating the number of cells which is expected to arrive during a future time slot, by adaptively learning the number of cells received during a setting time slot;
    a decision gate for deciding whether cell congestion will occur by using said predicted traffic values, an available buffer size of said output buffer and the number of cells to be transmitted during said setting time slot, and for generating the number of cells which cannot be processed during a future time slot when it is decided that the congestion will occur; and
    a traffic flow rate controller for calculating an optimal flow rate of each traffic source to control the congestion of said output buffer, by using service rates of said traffic sources, traffic types, peak bit rates, said predicted traffic values, and the number of cells which cannot be processed in said output buffer.

2. The traffic control apparatus of claim 1, wherein said traffic predictors receives the number of cells received during past time slots by the unit of the number of cells received during each time slot, predicts the number of cells which is expected to arrive during said future time slot, and generates said predicted traffic values.

3. The traffic control apparatus of claim 1, wherein said decision gate calculates the number of cells which cannot processed in said output buffer by subtracting the available buffer size of said output buffer and the number of cells to be transmitted during said setting time slot from a value adding said predicted traffic values with each other, determines its state as an on-state when the cell congestion is not predicted, and determines its state as an off-state when the cell congestion is predicted.

4. The traffic control apparatus of claim 2, wherein said decision gate calculates the number of cells which cannot processed in said output buffer by subtracting the available buffer size of said output buffer and the number of cells to be transmitted during said setting time slot from a value adding said predicted traffic values with each other, determines its state as an on-state when the cell congestion is not predicted, and determines its state as an off-state when the call congestion is predicted.

5. The traffic control apparatus of claim 3, wherein said traffic controller decreases a traffic flow rate in the order of a service rate of each traffic while maintaining quality of service demanded by a user, does not regulate the flow rate of the traffic whose predicted traffic value is zero, sends a traffic cell which is not sensitive to a delay to an extra buffer, and drops a cell exceeding a peak cell rate, when said decision gate indicates said on-state.

6. The traffic control apparatus of claim 5, wherein said traffic controller sends cells in said extra buffer to said output buffer, when said decision gate indicates said off-state.

7. The traffic control apparatus of claim 4, wherein said traffic controller decreases a traffic flow rate in the order of a service rate of each traffic while maintaining quality of service demanded by a user, does not regulate the flow rate of the traffic whose predicted traffic value is zero, sends a traffic cell which is not sensitive to a delay to an extra buffer, and drops a cell exceeding a peak cell rate, when said decision gate indicates said on-state.

8. The traffic control apparatus of claim 7, wherein said traffic controller sends cells in said extra buffer to said output buffer, when said decision gate indicates said off-state.

9. A traffic control method for an asynchronous transfer mode (ATM) exchange, comprising the steps of:
  (a) storing traffics generated by a plurality of traffic sources in an output buffer;
  (b) generating predicted traffic values designating the number of cells which is expected to arrive during a future time slot, by adaptively learning the number of cells received during a past setting time slot;
  (c) deciding whether cell congestion will occur by using a value adding said predicted traffic values with each other, an available buffer size of said output buffer and the number of cells to be transmitted during a setting time slot, and generating the number of cells which cannot be processed during a future time slot when it is decided that the congestion will occur; and
  (d) calculating an optimal flow rate of each traffic source to control the congestion of said output buffer, by using service rates of said traffic sources, traffic types, peak bit rates, the predicted traffic values, and the number of cells which cannot be processed in said output buffer.

10. The traffic control method of claim 9, wherein said step (b) includes the steps of:
  receiving the number of cells received during past time slots by the unit of the number of cells received during each time slot; and
  predicting the number of cells which is expected to arrive during a future time slot, and generates said predicted traffic values.

11. The traffic control method of claim 9, wherein said step (c) includes the steps of:
  adding said predicted traffic values with each other;
  calculating the number of cells which cannot processed in said output buffer by subtracting the available buffer size of said output buffer and the number of cells to be transmitted during said setting time slot from the added predicted traffic values;
  determining its state as an on-state when the cell congestion is not predicted; and
  determining its state as an off-state when the cell congestion is predicted.

12. The traffic control method of claim 10, wherein said step (c) includes the steps of:
  adding said predicted traffic values with each other;
  calculating the number of cells which cannot processed in said output buffer by subtracting the available buffer size of said output buffer and the number of cells to be transmitted during said setting time slot from the added predicted traffic values;
  determining its state as an on-state when the cell congestion is not predicted; and
  determining its state as an off-state when the cell congestion is predicted.

13. The traffic control method of claim 9, wherein said step (d) includes the steps of:
  when said decision gate indicates said on-state, decreasing a traffic flow rate in the order of a service rate of each traffic while maintaining quality of service demanded by a user, not regulating the flow rate of the traffic whose predicted traffic value is zero, sending a traffic cell which is not sensitive to a delay to an extra buffer, and dropping a cell exceeding a peak cell rate; and
  when said decision gate indicates said off-state, sending cells in said extra buffer to said output buffer.

14. The traffic control method of claim 10, wherein said step (d) includes the steps of:
  when said decision gate indicates said on-state, decreasing a traffic flow rate in the order of a service rate of each traffic while maintaining quality of service demanded by a user, not regulating the flow rate of the traffic whose predicted traffic value is zero, sending a traffic cell which is not sensitive to a delay to an extra buffer, and dropping a cell exceeding a peak cell rate; and
  when said decision gate indicates said off-state, sending cells in said extra buffer to said output buffer.

15. The traffic control method of claim 11, wherein said step (d) includes the steps of:
  when said decision gate indicates said on-state, decreasing a traffic flow rate in the order of a service rate of each traffic while maintaining quality of service demanded by a user, not regulating the flow rate of the traffic whose predicted traffic value is zero, sending a traffic cell which is not sensitive to a delay to an extra buffer, and dropping a cell exceeding a peak cell rate; and
  when said decision gate indicates said off-state, sending cells in said extra buffer to said output buffer.

16. A traffic control apparatus for controlling congestion in an asynchronous transfer mode (ATM) network, comprising:
  an output buffer;
  a plurality of traffic predictors coupled to receive different classes of traffic from corresponding traffic sources, for predicting the traffic for a future time slot with respect to each traffic source by adaptively learning a number of cells received during a setting time slot, and generating predicted traffic values;
  a traffic flow rate controller for calculating an optimal flow rate of each traffic source to control congestion of said output buffer, by using service rates of said traffic sources, traffic types, peak bit rates, the predicted traffic values, and the number of cells which cannot be processed in said output buffer; and
  a decision gate for deciding whether cell congestion will occur by using said predicted traffic values, an available buffer size of said output buffer and the number of cells to be transmitted during said setting time slot, and for generating the number of cells which cannot be processed during said future time slot when it is decided that the cell congestion will occur.

17. The traffic control apparatus of claim 16, wherein said traffic predictors receives the number of cells received during past time slots by the unit of the number of cells received during each time slot, predicts the number of cells which is expected to arrive during said future time slot, and generates said predicted traffic values.

18. The traffic control apparatus of claim 16, wherein said decision gate calculates the number of cells which cannot processed in said output buffer by subtracting the available buffer size of said output buffer and the number of cells to be transmitted during said setting time slot from a value adding said predicted traffic values with each other, determines its state as an on-state when the cell congestion is not predicted, and determines its state as an off-state when the cell congestion is predicted.

19. The traffic control apparatus of claim 16, wherein said traffic controller decreases a traffic flow rate in the order of a service rate of each traffic while maintaining quality of service demanded by a user, does not regulate the flow rate of the traffic whose predicted traffic value is zero, sends a traffic cell which is not sensitive to a delay to an extra buffer, and drops a cell exceeding a peak cell rate, when said decision gate indicates said on-state.

20. The traffic control apparatus of claim 19, wherein said traffic controller sends cells in said extra buffer to said output buffer, when said decision gate indicates said off-state.

* * * * *